(12) United States Patent
Williams

(10) Patent No.: US 8,371,612 B2
(45) Date of Patent: Feb. 12, 2013

(54) INFLATABLE AIRBAG ASSEMBLIES WITH LATERAL AND LONGITUDINAL TETHERS

(75) Inventor: Jeffrey D. Williams, Roy, UT (US)

(73) Assignee: Autoliv ASP, Inc., Ogden, UT (US)

( * ) Notice: Subject to any disclaimer, the term of this patent is extended or adjusted under 35 U.S.C. 154(b) by 358 days.

(21) Appl. No.: 12/562,040

(22) Filed: Sep. 17, 2009

(65) Prior Publication Data

US 2011/0062693 A1 Mar. 17, 2011

(51) Int. Cl.
*B60R 21/2338* (2011.01)
(52) U.S. Cl. .................................................. 280/743.2
(58) Field of Classification Search ............. 280/743.2
See application file for complete search history.

(56) References Cited

U.S. PATENT DOCUMENTS

| | | | |
|---|---|---|---|
| 3,843,150 A | 10/1974 | Harada et al. | |
| 5,129,675 A | 7/1992 | Wang | |
| 5,240,283 A | 8/1993 | Kishi et al. | |
| 5,310,214 A | 5/1994 | Cuevas | |
| 5,599,041 A | 2/1997 | Turnbull et al. | |
| 5,775,729 A | 7/1998 | Schneider et al. | |
| 5,927,748 A | 7/1999 | O'Driscoll | |
| 5,945,184 A | 8/1999 | Nagata et al. | |
| 6,419,267 B1 | 7/2002 | Hashimoto et al. | |
| 6,454,300 B1 | 9/2002 | Dunkle et al. | |
| 6,536,800 B2 | 3/2003 | Kumagai et al. | |
| 6,554,313 B2 | 4/2003 | Uchida | |
| 6,692,023 B2 * | 2/2004 | Tokita et al. ............... | 280/743.1 |
| 6,749,217 B2 | 6/2004 | Damian et al. | |
| 6,832,780 B2 | 12/2004 | Amamori | |
| 6,846,008 B2 | 1/2005 | Karniji et al. | |
| 6,971,664 B2 | 12/2005 | Amamori | |
| 7,000,947 B2 | 2/2006 | Kumagai et al. | |
| 7,052,042 B2 | 5/2006 | Sato et al. | |
| 7,131,664 B1 | 11/2006 | Pang et al. | |
| 7,152,880 B1 | 12/2006 | Pang et al. | |
| 7,192,053 B2 | 3/2007 | Thomas | |
| 7,243,947 B2 | 7/2007 | Bosch | |
| 7,350,807 B2 | 4/2008 | Schneider et al. | |
| 7,360,789 B2 * | 4/2008 | Bito ........................... | 280/743.1 |
| 7,396,043 B2 | 7/2008 | Choi et al. | |
| 7,455,317 B2 | 11/2008 | Bito | |
| 7,458,605 B2 | 12/2008 | Hasebe et al. | |
| 7,484,757 B2 | 2/2009 | Thomas et al. | |
| 7,604,252 B2 | 10/2009 | Heitplatz et al. | |
| 7,654,561 B2 | 2/2010 | Webber et al. | |
| 7,673,899 B2 | 3/2010 | Abe | |
| 7,695,012 B2 | 4/2010 | Libby et al. | |

(Continued)

FOREIGN PATENT DOCUMENTS

| | | |
|---|---|---|
| GB | 1 362 672 | 8/1974 |
| JP | 11321506 | 11/1999 |

(Continued)

*Primary Examiner* — Paul N Dickson
*Assistant Examiner* — Joselynn Y Sliteris
(74) *Attorney, Agent, or Firm* — Sally J. Brown; Stoel Rives LLP

(57) ABSTRACT

Lateral and longitudinal internal tethers can be used to restrict an inflatable airbag to a predetermined shape when inflated. A longitudinal tether extends from a rear portion or throat portion of the airbag to a front face. The portion of the front face that cushions an occupant can have a concave or planar shape, depending on the lengths of the lateral and/or longitudinal tethers.

26 Claims, 12 Drawing Sheets

U.S. PATENT DOCUMENTS

| | | |
|---|---|---|
| 7,762,576 B2 | 7/2010 | Cho |
| 7,938,445 B2 | 5/2011 | Smith et al. |
| 7,946,613 B2 | 5/2011 | Rose et al. |
| 8,011,691 B2 * | 9/2011 | Urushibata et al. ........ 280/743.2 |
| 2001/0033072 A1 | 10/2001 | Kumagai et al. |
| 2002/0063416 A1 | 5/2002 | Kamaiji et al. |
| 2002/0175511 A1 | 11/2002 | Dunkle et al. |
| 2003/0030254 A1 | 2/2003 | Hasebe |
| 2003/0057691 A1 | 3/2003 | Tokita et al. |
| 2003/0218325 A1 | 11/2003 | Hasebe et al. |
| 2003/0230883 A1 | 12/2003 | Heym |
| 2004/0164526 A1 | 8/2004 | Hasebe et al. |
| 2004/0232681 A1 | 11/2004 | Adomeit |
| 2005/0035582 A1 | 2/2005 | Kim |
| 2005/0057027 A1 | 3/2005 | Fogle et al. |
| 2005/0077708 A1 | 4/2005 | Sollars |
| 2005/0098994 A1 | 5/2005 | Matsumura |
| 2005/0161918 A1 | 7/2005 | Bito |
| 2006/0001244 A1 | 1/2006 | Taguchi et al. |
| 2006/0028009 A1 | 2/2006 | Hasebe et al. |
| 2006/0049618 A1 | 3/2006 | Bito |
| 2006/0103118 A1 | 5/2006 | Hasebe |
| 2006/0186647 A1 | 8/2006 | Bosch |
| 2006/0197318 A1 | 9/2006 | Choi et al. |
| 2006/0249934 A1 | 11/2006 | Hasebe |
| 2006/0267323 A1 | 11/2006 | Schneider et al. |
| 2007/0024032 A1 | 2/2007 | Hasebe |
| 2007/0040358 A1 | 2/2007 | Kismir |
| 2007/0045997 A1 | 3/2007 | Abe et al. |
| 2007/0132222 A1 | 6/2007 | Thomas et al. |
| 2007/0182143 A1 | 8/2007 | Wright |
| 2007/0200320 A1 | 8/2007 | Keshavaraj |
| 2007/0205591 A1 | 9/2007 | Bito |
| 2007/0262572 A1 | 11/2007 | Fischer et al. |
| 2007/0290489 A1 | 12/2007 | Aranzulla et al. |
| 2009/0250912 A1 | 10/2009 | Libby et al. |
| 2010/0225094 A1 | 9/2010 | Rose et al. |
| 2010/0225095 A1 | 9/2010 | Smith et al. |

FOREIGN PATENT DOCUMENTS

| | | |
|---|---|---|
| JP | 2001-030863 | 2/2001 |
| JP | 2005-247118 | 9/2005 |
| JP | 2005-280470 | 10/2005 |
| WO | WO-2006/127653 | 11/2006 |
| WO | WO-2010/101673 | 9/2010 |
| WO | WO-2011/035199 | 3/2011 |

* cited by examiner

INFLATABLE AIRBAG ASSEMBLIES WITH LATERAL AND LONGITUDINAL TETHERS

TECHNICAL FIELD

The present disclosure relates generally to the field of automotive protective systems. More specifically, the present disclosure relates to inflatable airbag cushions having lateral tethers and longitudinal tethers.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered to be limiting of the disclosure's scope, the embodiments will be described and explained with specificity and detail in reference to the accompanying drawings.

DETAILED DESCRIPTION OF PREFERRED EMBODIMENTS

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

The phrases "connected to," "coupled to" and "in communication with" refer to any form of interaction between two or more entities, including mechanical, electrical, magnetic, electromagnetic, fluid, and thermal interaction. Two components may be coupled to each other even though they are not in direct contact with each other. The term "abutting" refers to items that are in direct physical contact with each other, although the items may not necessarily be attached together.

Inflatable airbag systems are widely used to minimize occupant injury in a collision scenario. Airbag modules have been installed at various locations within a vehicle, including, but not limited to, the steering wheel, the instrument panel, within the side doors or side seats, adjacent to roof rail of the vehicle, in an overhead position, or at the knee or leg position. In the following disclosure, "airbag" may refer to an inflatable curtain airbag, overhead airbag, front airbag, or any other airbag type.

Front airbags are typically installed in the steering wheel and instrument panel of a vehicle. During installation, the airbags are rolled, folded, or both into a packaged configuration. The airbag is typically packaged into an airbag housing that may have a cosmetic cover. During a collision event, vehicle sensors trigger the activation of an inflator, which rapidly fills the airbag with inflation gas. Thus the airbag rapidly changes confirmations from the rolled/folded configuration to an expanded configuration.

Figure 1:
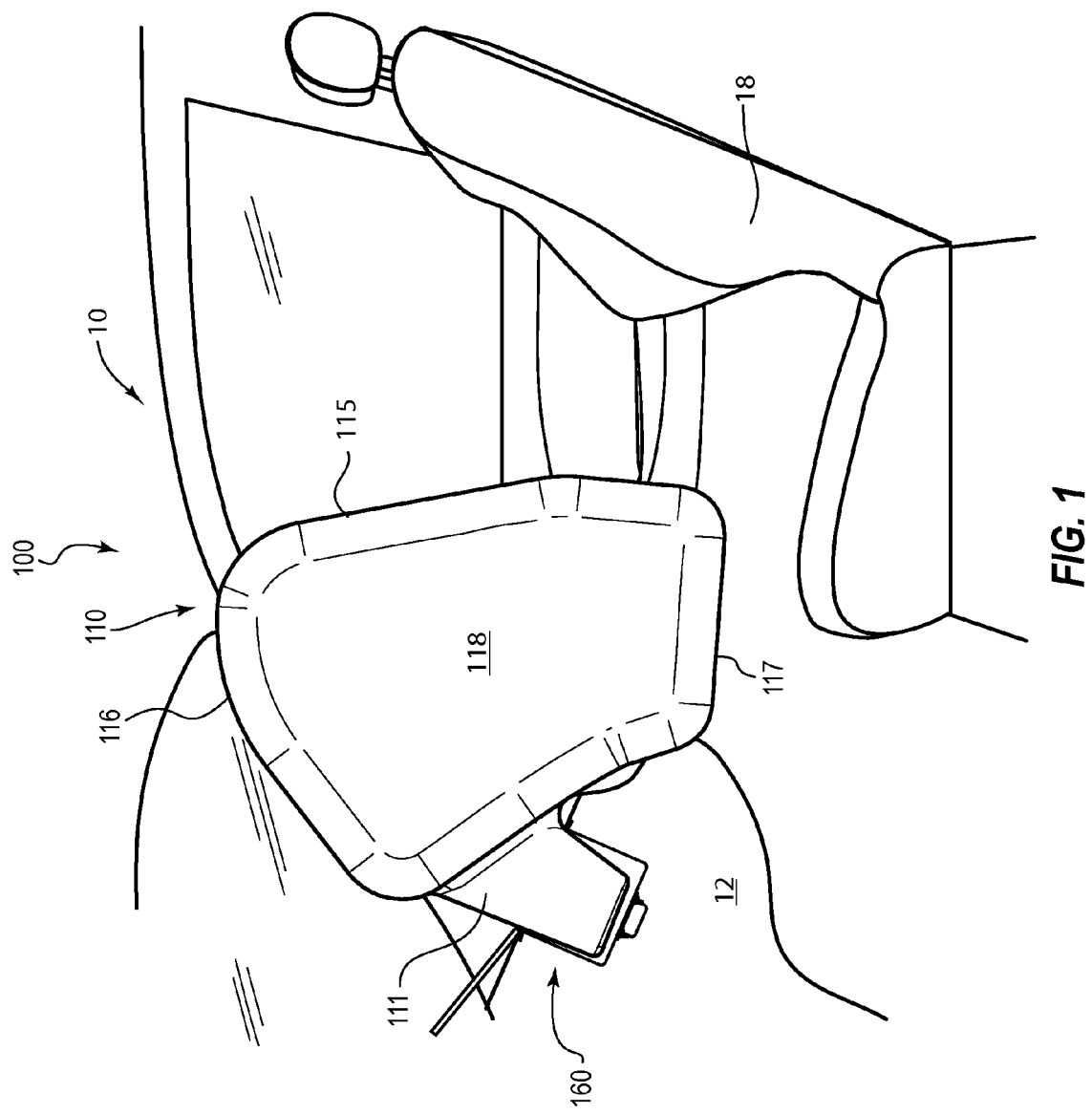
FIG. 1 is a perspective view of an inflatable airbag assembly in a deployed and inflated configuration, wherein the airbag is mounted within a vehicle.

FIG. 1 is a perspective view of an inflatable airbag assembly 100 that is mounted within an instrument panel 12 of a vehicle 10. Inflatable airbag assembly 100 may comprise an inflatable airbag 110, an inflatable airbag housing 160, and an inflator. Airbag 110 may be coupled to housing 160 via a throat portion 111. Upon activation of the inflator, airbag 110 deploys into a cabin of vehicle 10, toward seat 18, in which an occupant may be seated.

Inflatable airbag 110 also comprises a front face 115, a top face 116, a bottom face 117, and a side face 118. Top face 116 of cushion 110 is the portion of the cushion that is closest to the headliner of a vehicle when the cushion is in a deployed state. Bottom face 117 is below top face 116 when cushion 110 is in a deployed state, and is closest to a floor of the vehicle. The term "bottom face" is not necessarily limited to the portion of cushion 110 that is below a horizontal medial plane of the cushion, but may include less than half, more than half or exactly half of the bottom portion of the cushion. Likewise, the term "top face" is not necessarily limited to the portion of cushion 110 that is above a horizontal medial plane of the cushion, but may include less than half, more than half or exactly half of the top portion of the cushion.

Those skilled in the art will appreciate that a variety of types and configurations of inflatable airbags can be utilized without departing from the scope and spirit of the present disclosure. For example, the size, shape, and proportions of the cushion membrane may vary according to its use in different vehicles or different locations within a vehicle. Also, the inflatable airbag cushion membrane may comprise one or more pieces of any material well known in the art, such as a woven nylon fabric. Additionally, the airbag cushion may be manufactured using a variety of techniques such as one piece weaving, "cut and sew", or a combination of the two techniques. Further, the cushion membrane may be manufactured using sealed or unsealed seams, wherein the seams are formed by stitching, adhesive, taping, radio frequency welding, heat sealing, or any other suitable technique or combination of techniques. The inflatable airbag may comprise one or more vents, which may be configured as discreet vents or dynamic vents. Generally, discreet vents do not change diameter during airbag deployment, and may not vary their capacity to vent inflation gas out the inflatable void of the airbag may not change during deployment. Dynamic vents may change diameter during airbag deployment and may vary their capacity to vent inflation gas out the inflatable void of the airbag may not change during deployment.

Figure 2:
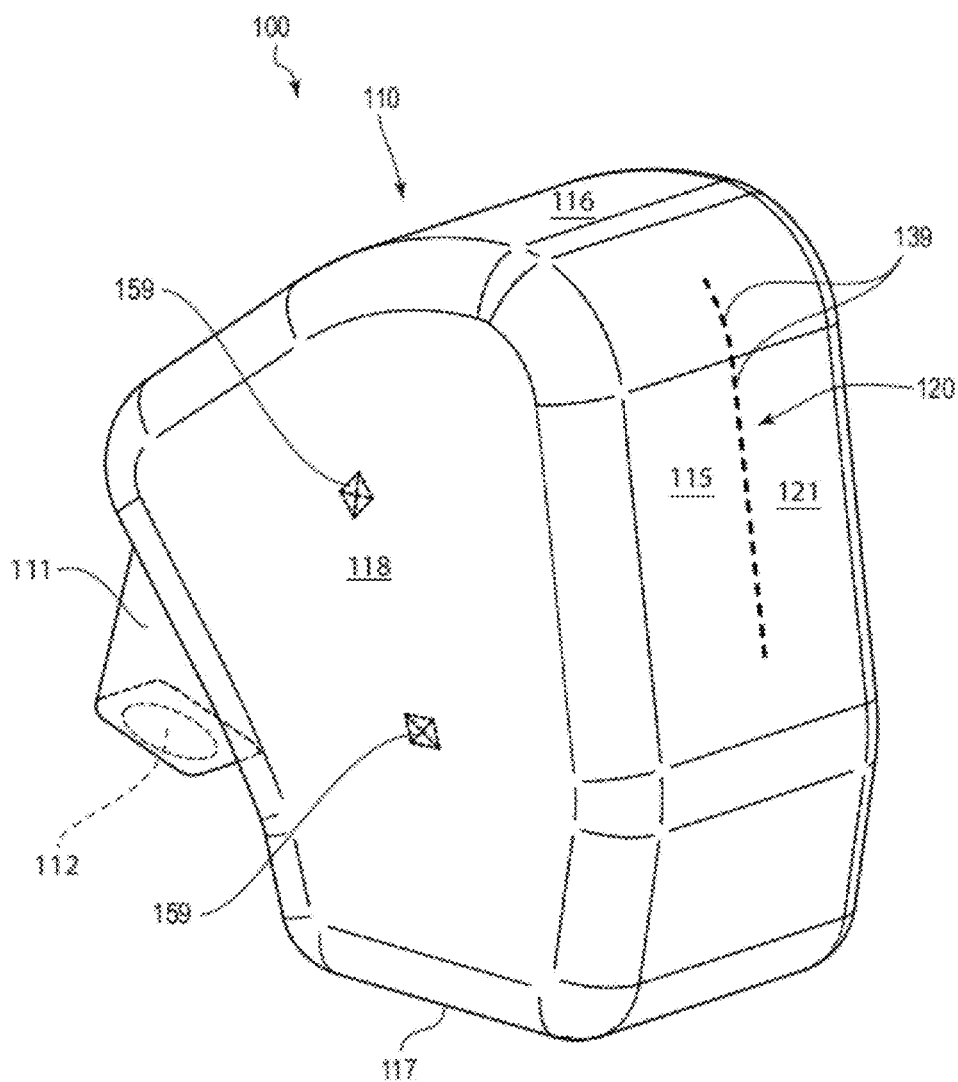
FIG. 2 is a perspective view of the inflatable airbag assembly of FIG. 1 in a deployed and inflated configuration.

FIG. 2 is a perspective view of a portion of airbag assembly 100, wherein inflatable airbag 110 is depicted in a deployed and inflated state. Throat portion 111 may comprise an inflator aperture 112, into which an inflator may be inserted, or into which inflation gas may flow. Front face 115 is the face of airbag 110 that is most likely to cushion an occupant when the airbag is deployed; therefore, the size and shape of front face 115 have predetermined properties. In various embodiments, the cushioning portion of the front face may have different shapes and orientations such that the cushioning portion demonstrates better performance in cushioning a predetermined portion of an occupant, a predetermined range of sizes of occupants, or a combination of the preceding. Front face 115 is located between top face 116 and bottom face 117 and is opposite throat portion 111. A portion of front face 115 may comprise an occupant cushioning portion 120, which has a predetermined size and shape, wherein the size and shape are at least partially dictated by internal tethers. Stitching 139 couples a longitudinal tether to cushioning portion 120, and stitching 159 couples lateral tethers to side faces 118 of airbag 110.

Figure 3:
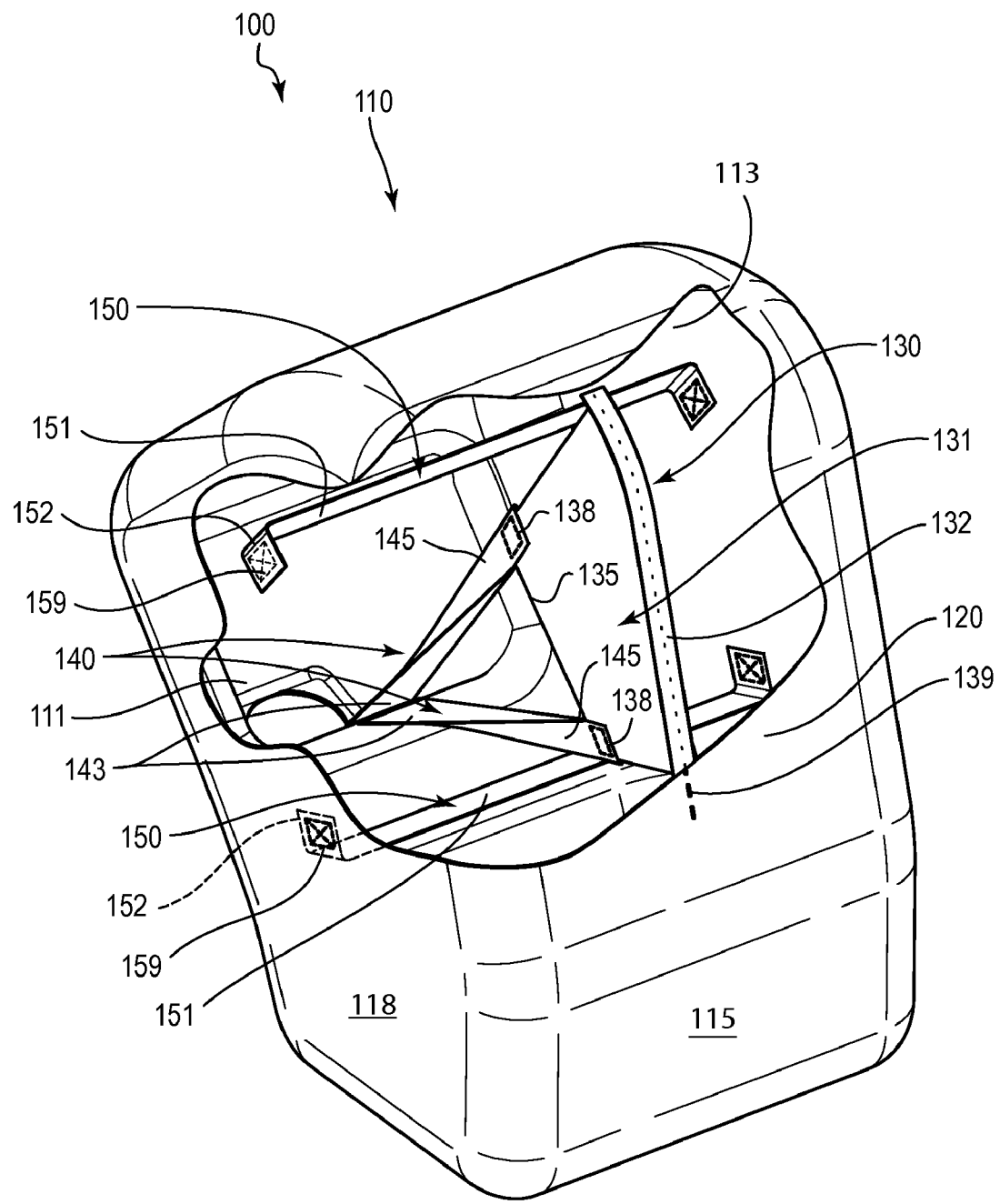
FIG. 3 is a cutaway perspective view of the inflatable airbag assembly of FIG. 1, wherein the airbag is in a deployed and inflated configuration.
Figure 4:
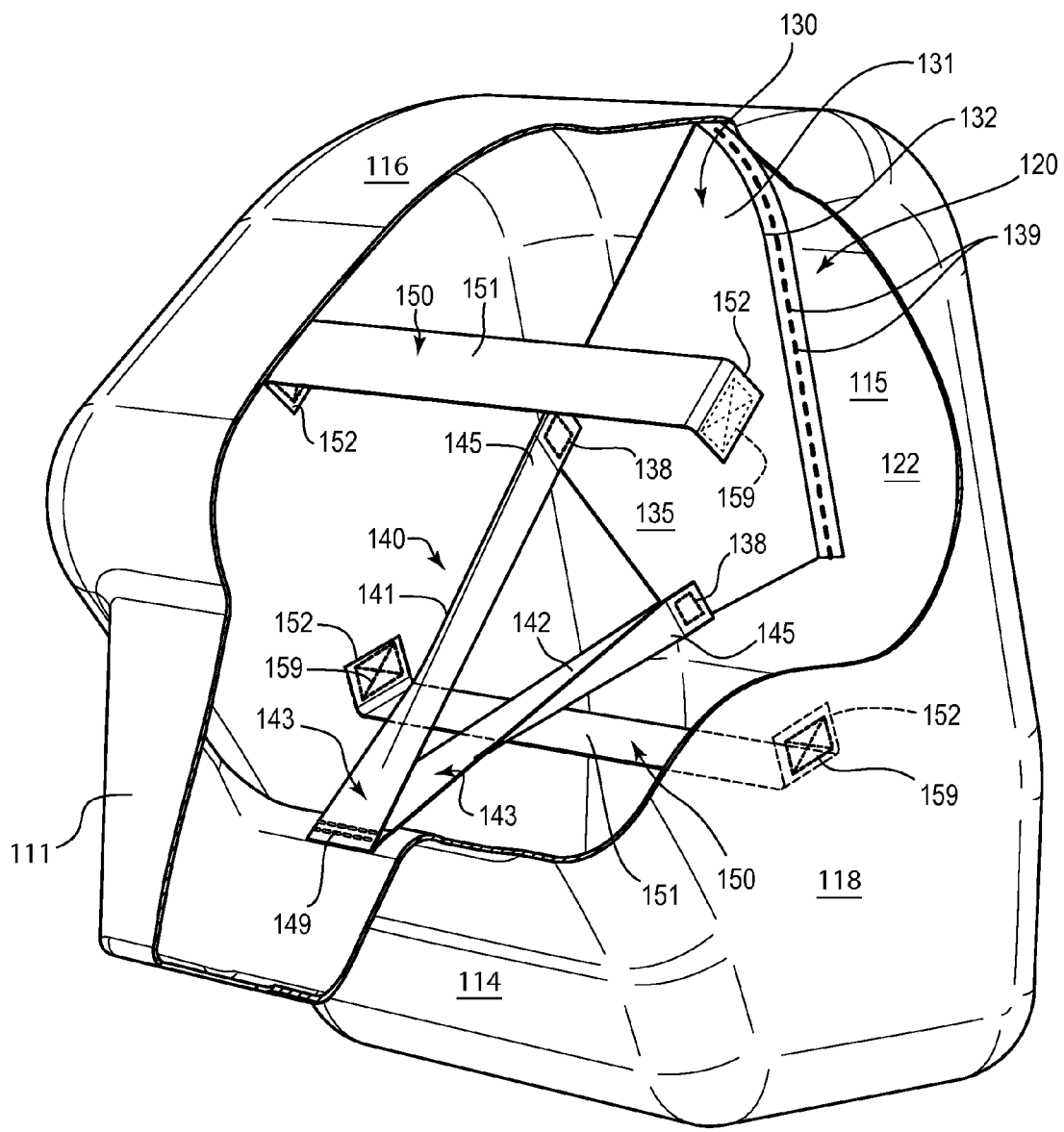
FIG. 4 is another cutaway perspective view of the inflatable airbag assembly of FIG. 1, wherein the airbag is in a deployed and inflated configuration.

FIGS. 3-4 are cutaway perspective views of the portion of airbag assembly 100 depicted in FIG. 2. Inflatable airbag 110 may comprise an inflatable void, within which longitudinal tether 130 and one or more lateral tethers 150 can be located. Longitudinal and lateral tethers 130 and 150 may comprise a woven nylon or webbing material. Longitudinal tether 130 may comprise a face-proximal portion 131 and a throat-proximal portion 140. Face-proximal portion 131 may comprise a face attachment region 132 and a face-distal region 135. Face attachment region 132 may comprise a folded portion of face-proximal portion 131 and may be coupled via stitching 139 to an interior side 122 of cushioning portion 120 of front face 115. In the deployed configuration, face attachment region 132 may be said to be vertically oriented. Cushioning portion 120 of front face 115 may be defined as an area of front face 115 to which longitudinal tether 130 is coupled.

Throat-proximal portion 140 of longitudinal tether 130 may comprise a first leg 141 and a second leg 142. Each of the first and second legs 141 and 142 may comprise a throat coupling region 143 and a throat-distal region 145. Face-distal region 135 of face-proximal portion 131 may be coupled to throat-distal region 145 of throat-proximal portion 140 via stitching 138. Throat coupling regions 143 of first and second legs 141 and 142 overlap at an attachment point, such as the attachment point defined by stitching 149. Throat coupling region 143 may be coupled to throat portion 111 via stitching 149. In another embodiment, throat coupling region 143 may be coupled to a rear face 114 of airbag 110. In a deployed configuration, throat coupling region 143 may be said to be horizontally oriented.

Lateral tethers 150 may each comprise an elongated body portion 151 of a predetermined length and two opposing attachment portions 152. Attachment portions 152 of lateral tethers 150 may be coupled to side faces 118 via stitching 159. Inflatable airbag 110 may comprise one or more lateral tethers 150, which have predetermined locations and are arranged in predetermined orientations.

Longitudinal tether 130 and lateral tethers 150 each comprise predetermined lengths and are each coupled to inflatable airbag 110 at predetermined locations, such that the tethers are configured to cause the airbag, when inflated, to adopt a predetermined shape and orientation. Longitudinal tether 130 is configured to restrict a longitudinal deployment distance of inflatable airbag 110. Similarly, lateral tethers 150 are configured to restrict a lateral deployment distance of inflatable airbag 110. Longitudinal and lateral tethers 130 and 150 may be called "fixed length" tethers, in that they are not configured to shorten, elongate, or be released during the course of inflatable airbag 110 deployment.

In one embodiment, longitudinal and lateral tethers 130 and 150 are configured to cause cushioning portion 120 of front face 115 to have a planar shape. In other embodiments, the lengths of the longitudinal and lateral tethers may be altered to form a concave or convex occupant cushioning portion. In the depicted embodiment, each side face 118 forms an angle with front face 115 that is about 90°. In other embodiments, the angle formed between a side face and the front face may be between about 80° and about 100°.

Figure 5:
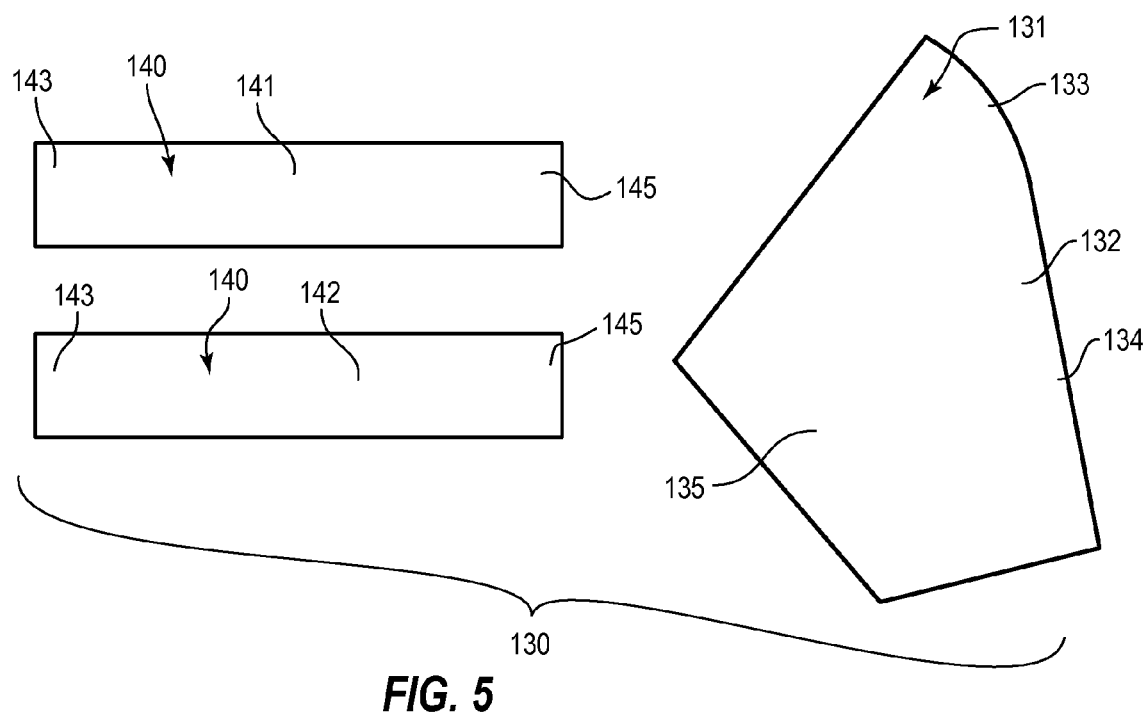
FIG. 5 is a side elevation view of components of an embodiment of a longitudinal tether.
Figure 6:
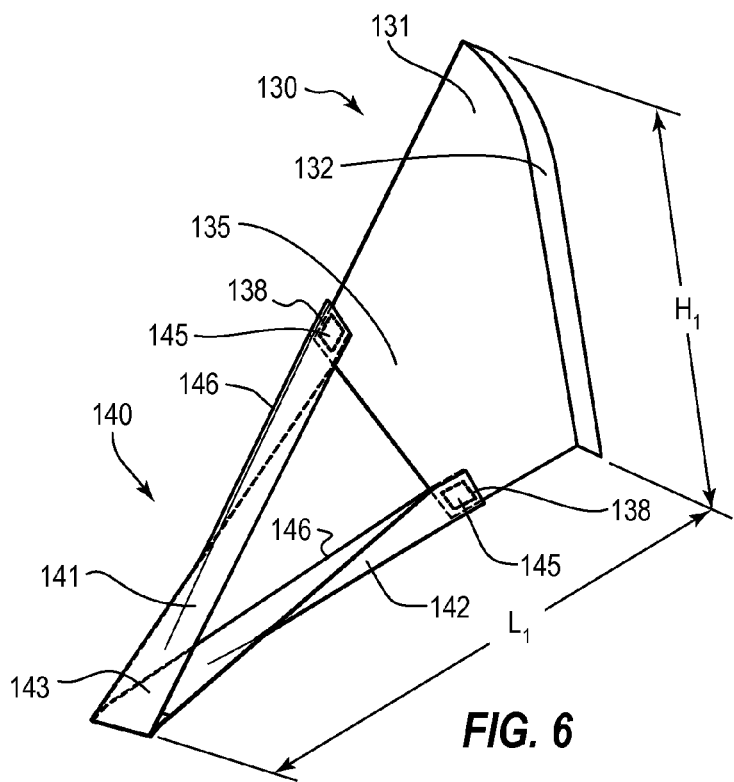
FIG. 6 is a perspective view of the components of the longitudinal tether of FIG. 5 after the components have been assembled.

FIGS. 5-6 depict components of longitudinal tether 130. FIG. 5 is a side elevation view depicting the components before they have been assembled, and FIG. 6 is a perspective view of the components after they have been assembled. In the depicted embodiment, longitudinal tether 130 comprises three pieces of material: face-proximal portion 131, first leg 141, and second leg 142. Face-proximal portion 131 has face attachment region 132 and face-distal region 135. Face attachment region 132 may comprise a curved portion 133 and a linear portion 134. One skilled in the art will recognize that the shape or contours of the face attachment region of the longitudinal tether may be altered to match the shape or contours of the front face of the airbag in which the longitudinal tether will be placed. Face attachment region 132 may comprise a height $H_1$ between about 100 mm and about 600 mm. The face attachment region may comprise from about 15% to about 75% of the height of the front face of the airbag.

Longitudinal tether 130 also comprises a throat-proximal portion 140, which in the depicted embodiment, comprises a first leg 141 and a second leg 142. Each of the first and second legs 141 and 142 may comprise a throat coupling region 143 and a throat-distal region 145. First and second legs 141 and 142 may have different lengths, or may have similar lengths. Also, first and second legs 141 and 142 may comprise a width that is sufficient such that each of the legs can be folded along a long axis. Folded throat-distal regions 145 may be coupled to face-distal region 135 such that a portion of the face-distal region is located between folded sides of legs 141 and 142. Stitching 138 may be employed to couple face-proximal portion 131 to throat-proximal portions 140. Throat coupling regions 143 may be coupled to the throat of an airbag in a folded configuration or in an unfolded configuration, as depicted in FIG. 6. As described herein, a length $L_1$ of longitudinal tether 130 is predetermined and may vary according to use with different inflatable airbags; however, in the depicted embodiment, $L_1$ may be between about 250 mm and about 700 mm.

Figure 7:
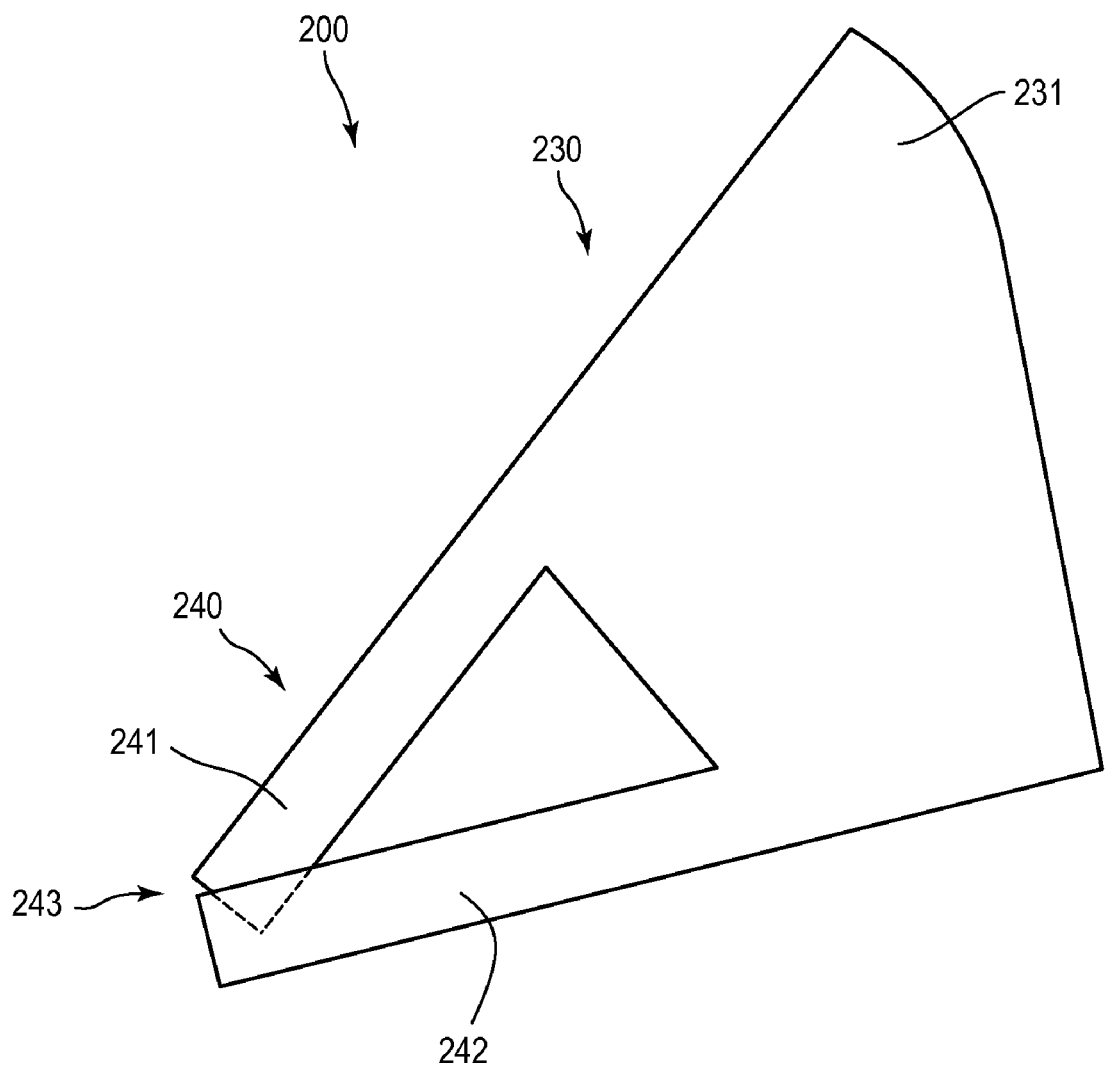
FIG. 7 is a side elevation view of another embodiment of a longitudinal tether.

FIG. 7 is a perspective view of another embodiment of a longitudinal tether 230, which may be a component of an inflatable airbag assembly 200. Airbag assembly 200 and longitudinal tether 230 can resemble airbag assembly 100 and coupling and longitudinal tether 130 described above, in certain respects; accordingly, like features may be designated with like reference numerals, with the leading hundreds numeral incremented from "1" to "2". Any suitable combination of the features described with respect to airbag assembly 100 and longitudinal tether 130 can be employed with assembly 200 and longitudinal tether 230, and vice versa.

Longitudinal tether 230 comprises a single piece of material that comprises a face attachment region 231 and a throat-proximal portion 240. Throat-proximal portion 240 comprises a first leg 241 and a second leg 242. Each of the first and second legs 241 and 242 comprise a throat-proximal portion, which may be coupled to a throat portion or a rear face of an inflatable airbag. Throat-proximal portion 240 has a throat coupling region 243, which includes the ends of first and second legs 241 and 242.

FIG. 8-13 depict another embodiment of an inflatable airbag assembly 300 with a longitudinal tether 330. Airbag assembly 300 and longitudinal tether 330 can resemble airbag assemblies 100 and 200 and coupling and longitudinal tethers 130 and 230 described above, in certain respects; accordingly, like features may be designated with like reference numerals, with the leading hundreds numeral incremented from "1" or "2" to "3". Any suitable combination of the features described with respect to airbag assemblies 100 and 200 and longitudinal tethers 130 and 230 can be employed with assembly 300 and longitudinal tether 330, and vice versa.

Figure 8:
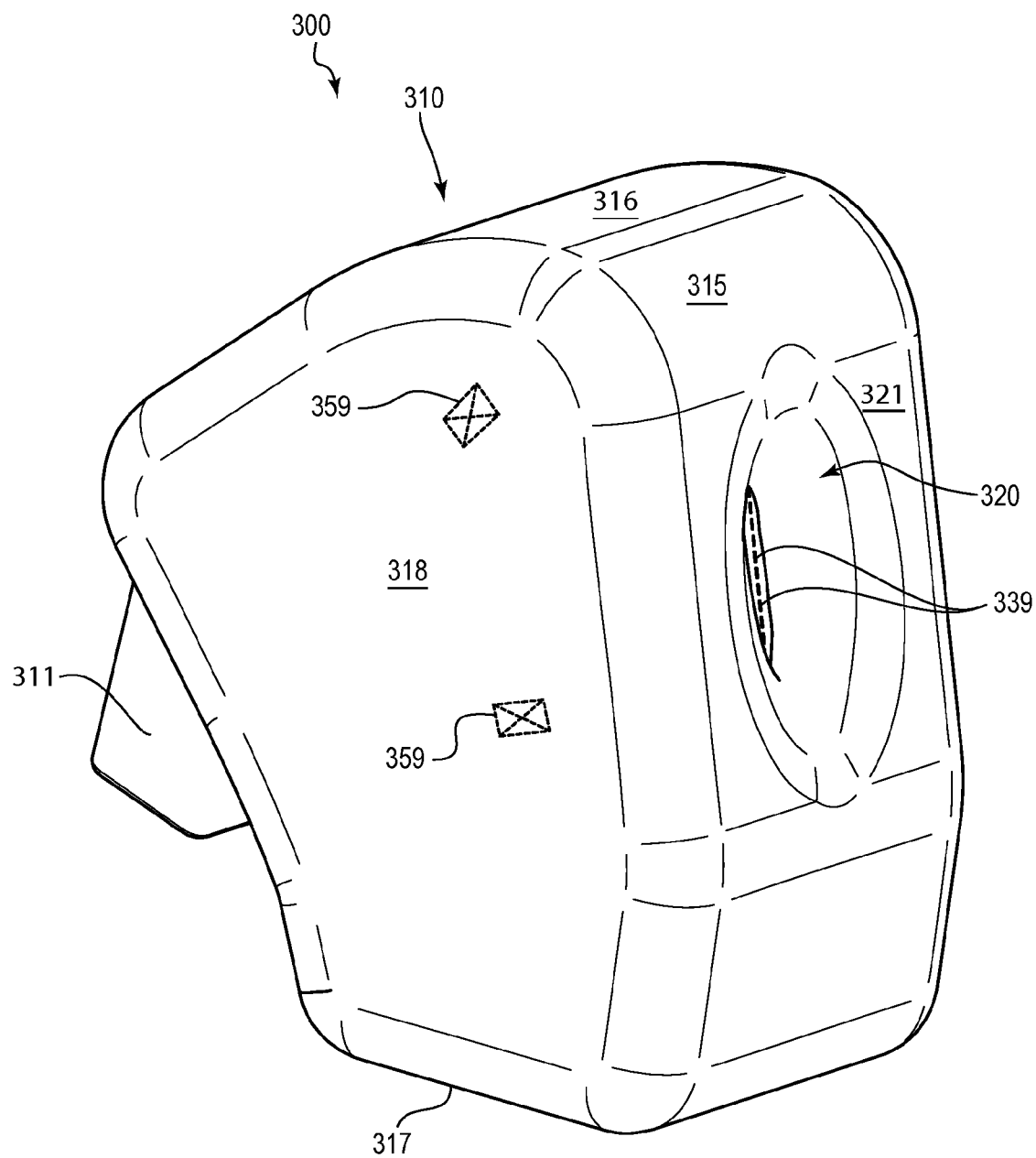
FIG. 8 is a perspective view of another embodiment of an inflatable airbag assembly, wherein an airbag of the assembly is in a deployed and inflated configuration.

FIG. 8 is a perspective view of inflatable airbag 310 wherein the airbag is depicted in a deployed and inflated state. Front face 315 is the face of airbag 310 that is most likely to cushion an occupant when the airbag is deployed; therefore, the size and shape of front face 315 have predetermined properties. In various embodiments, the cushioning portion of the front face may have different shapes and orientations such that the cushioning portion demonstrates better performance in cushioning a predetermined portion of an occupant, a predetermined range of sizes of occupants, or a combination of the preceding. Front face 315 is located between top face 316 and bottom face 317 and is opposite throat coupling region 311. A portion of front face 315 may comprise an occupant cushioning portion 320, which has a predetermined size and shape, wherein the size and shape are at least partially dictated by internal tethers. In the depicted embodiment, occupant cushioning portion 320 comprises an oval shape. Stitching 339 couples a longitudinal tether to cushioning portion 320, and stitching 359 couples lateral tethers to side faces 318 of airbag 310. In the depicted embodiment, an exterior side 321 of cushioning portion 320 comprises a concave shape.

Figure 9:
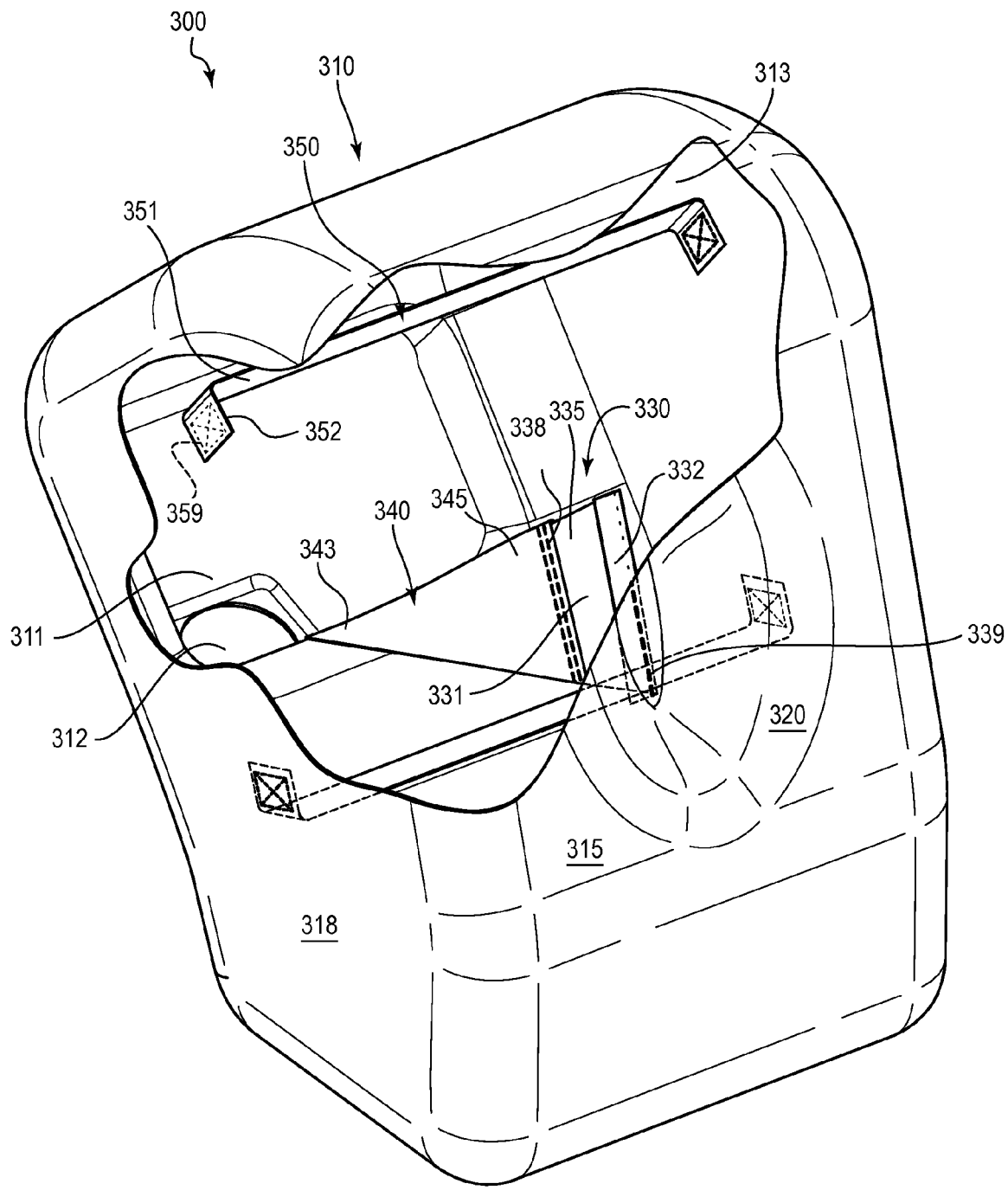
FIG. 9 is a cutaway perspective view of the inflatable airbag assembly of FIG. 8.
Figure 10:
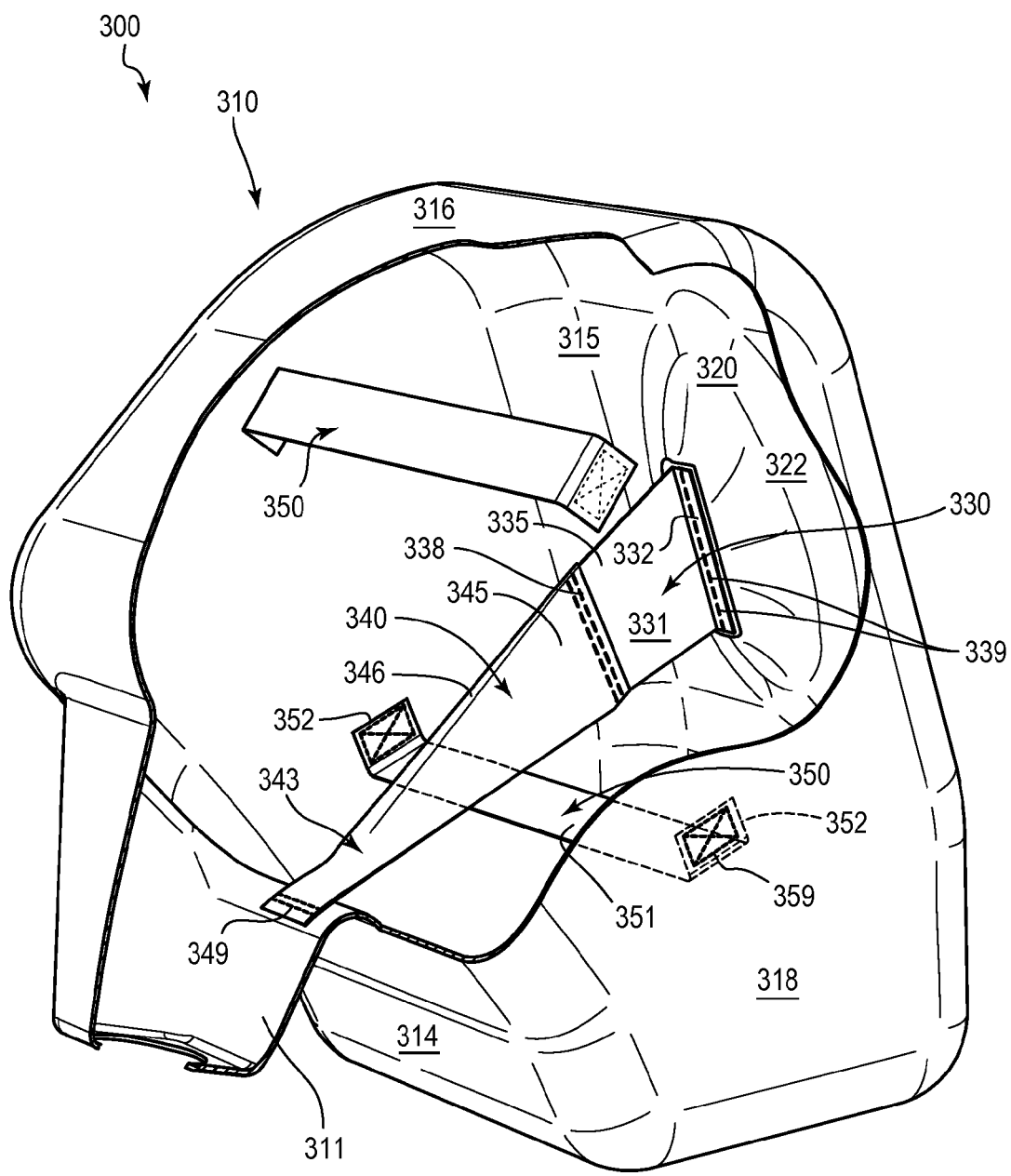
FIG. 10 is another cutaway perspective view of the inflatable airbag assembly of FIG. 8.

FIGS. 9-10 are cutaway perspective views of the portion of airbag assembly 300 depicted in FIG. 8. Inflatable airbag 310 may comprise an inflatable void, within which longitudinal tether 330 and one or more lateral tethers 350 can be located. Longitudinal and lateral tethers 330 and 350 may comprise a woven nylon or webbing material. Longitudinal tether 330 may comprise a face-proximal portion 331 and a throat-proximal portion 340. Face-proximal portion 331 may comprise a face attachment region 332 and a face-distal region 335. Face attachment region 332 may comprise a folded region of face-proximal portion 331 and may be coupled via stitching 339 to an interior side 322 of cushioning portion 320 of front face 315. In a deployed configuration, face attachment region 332 may be said to be vertically oriented. Cushioning portion 320 of front face 315 may be defined as an area of front face 315 to which lateral tether 330 is coupled.

Throat-proximal portion 340 of longitudinal tether 330 may comprise a throat coupling region 343 and a throat-distal region 345. Face-distal region 335 of face-proximal portion 331 may be coupled to throat-distal region 345 of throat-proximal portion 340 via stitching 338. Throat coupling region 343 may be coupled to throat coupling region 311 via stitching 349. Throat-proximal portion 340 may comprise a folded piece of material, wherein throat-distal region 345 is folded and attached to face-proximal portion 331 and throat coupling region 343 is not folded. In another embodiment, throat coupling region 343 may be coupled to a rear face 314 of airbag 310. In a deployed configuration, throat coupling region 343 may be said to be horizontally oriented.

Lateral tethers 350 may each comprise an elongated body portion 351 of a predetermined length and two opposing attachment portions 352. Attachment portions 352 of lateral tethers 350 may be coupled to side faces 318 via stitching 359. Inflatable airbag 310 may comprise one or more lateral tethers 350, which have predetermined locations and are arranged in predetermined orientations.

Longitudinal tether 330 and lateral tethers 350 each comprise predetermined lengths and are each coupled to inflatable airbag 310 at predetermined locations, such that the tethers are configured to cause the airbag, when inflated, to adopt a predetermined shape and orientation. Longitudinal tether 330 is configured to restrict a longitudinal deployment distance of inflatable airbag 310. Similarly, lateral tethers 350 are configured to restrict a lateral deployment distance of inflatable airbag 310. Longitudinal and lateral tethers 330 and 350 may be called "fixed length" tethers, in that they are not configured to shorten, elongate, or be released during the course of inflatable airbag 310 deployment.

In one embodiment, longitudinal and lateral tethers 130 and 150 are configured to cause cushioning portion 320 of front face 315 to have a planar shape. In other embodiments, the lengths of the longitudinal and lateral tethers may be altered to change a depth of the concave occupant cushioning portion. In the depicted embodiment, each side face 318 forms an angle with front face 315 that is about 90°. In other embodiments, the angle formed between a side face and the front face may be between about 80° and about 100°.

Figure 11:
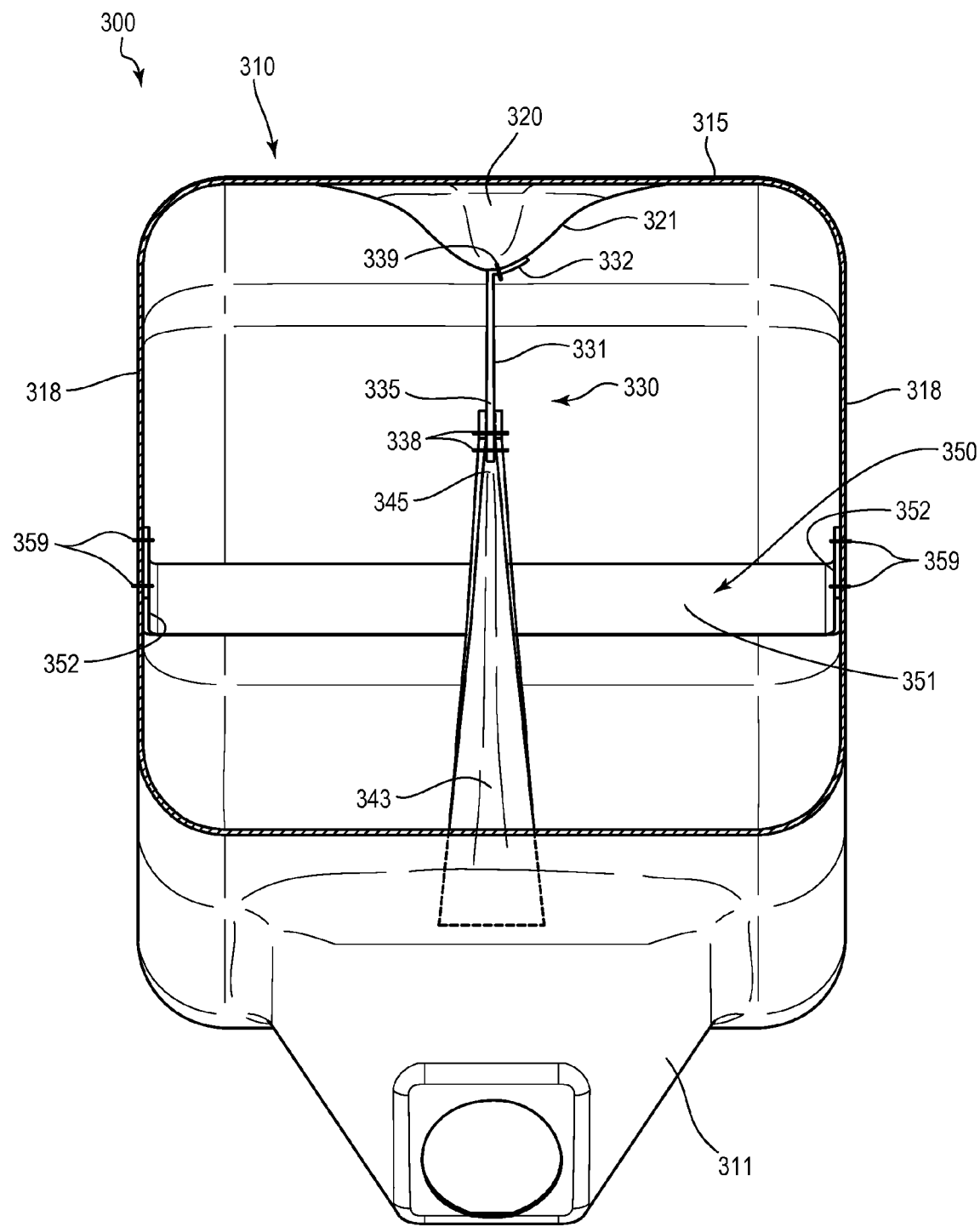
FIG. 11 is another cutaway perspective view of the inflatable airbag assembly of FIG. 8.

FIG. 11 is a bottom perspective view of airbag assembly 300. As described herein, inflatable airbag 310 may comprise one or more lateral tethers 350, which can have an elongated body 351 and two opposing attachment portions 352. Attachment portions 352 may be coupled to side faces 318 of airbag 310 via stitching 359. Airbag 310 also comprises lateral tether 330, which extends from airbag 110 throat coupling region 311 to front face 315. Lateral tether 330 may be coupled to interior side 121 of front face 315 via an attachment region 332 and stitching 339. Throat-proximal portion 340 of lateral tether 330 may be coupled to the face-proximal portion via stitching 338, which attaches face-distal region 335 to throat-distal region 345. Throat coupling region 343 may be coupled to throat coupling region 311 via stitching. Lateral tether 330 comprises a predetermined length such that a concave occupant cushioning portion 320 is formed in front face 315.

Figure 12:
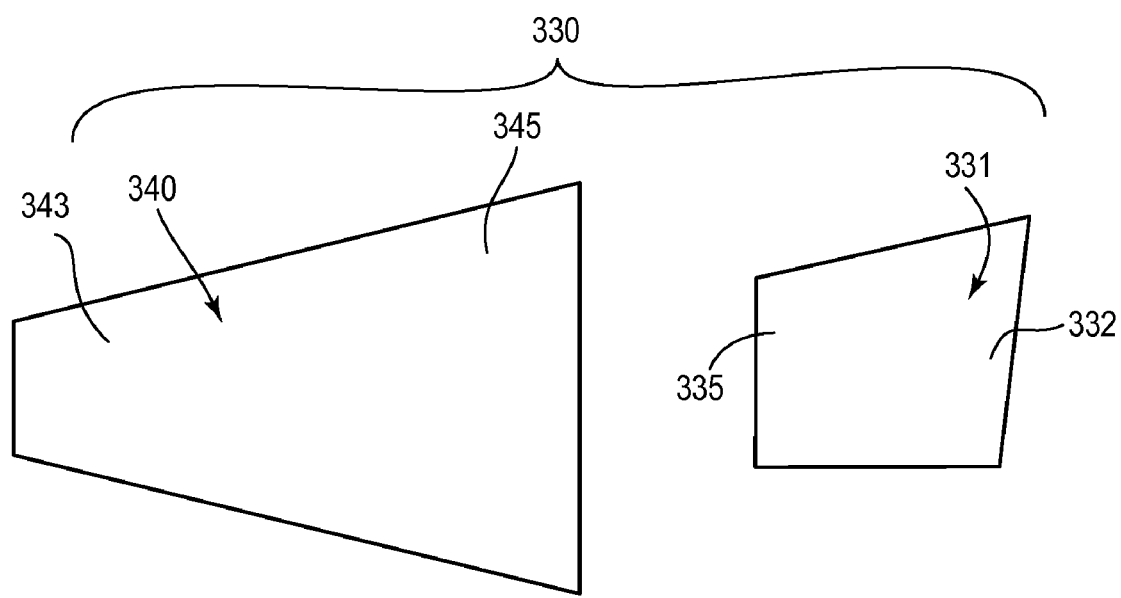
FIG. 12 is a side elevation view of components of another embodiment of a longitudinal tether.
Figure 13:
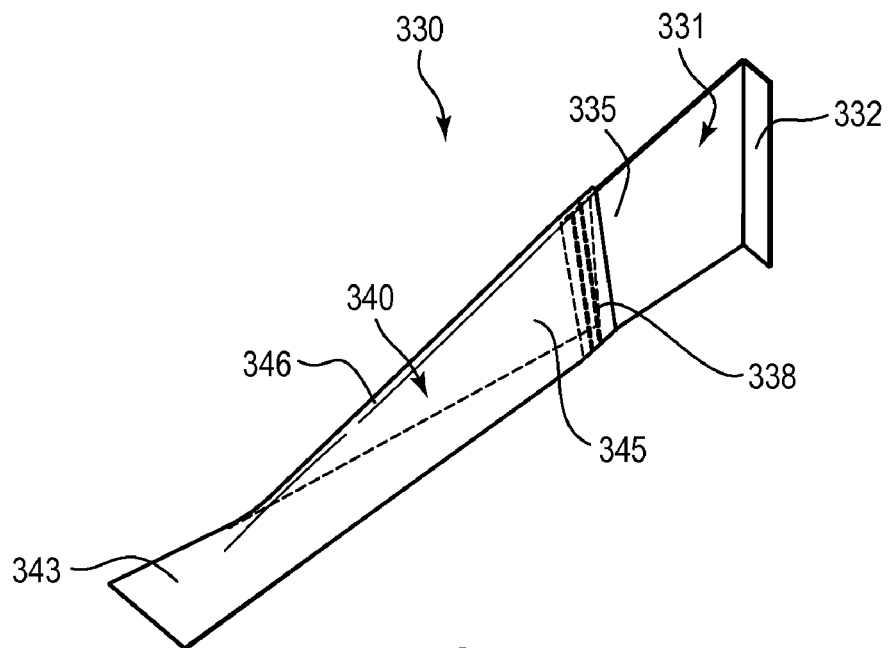
FIG. 13 is a perspective view of the components of the longitudinal tether of FIG. 12 after the components have been assembled.

FIGS. 12-13 depict components of longitudinal tether 330. FIG. 12 is a side elevation view depicting the components before they have been assembled, and FIG. 13 is a perspective view of the components after they have been assembled. In the depicted embodiment, longitudinal tether 330 comprises two pieces of material: face-proximal portion 331, and throat-proximal portion 340. Face-proximal portion 331 has face attachment region 332 and face-distal region 335. In the depicted embodiment, face attachment region 332 comprises a linear contour; however in other embodiments, the face attachment region may comprise a curved portion.

Throat-proximal portion 340 may comprise a throat coupling region 343 and a throat-distal region 345. Throat-distal region 345 may comprise a width sufficient that it can be folded along a long axis. Folded throat-distal region 345 may be coupled to face-distal region 335 such that a portion of the face-distal region is located between folded sides the throat-distal region. Stitching 338 may be employed to couple face-proximal portion 331 to throat-proximal portions 340. Throat coupling region 343 may be coupled to the throat of an airbag in a folded configuration or in an unfolded configuration.

Figure 14:
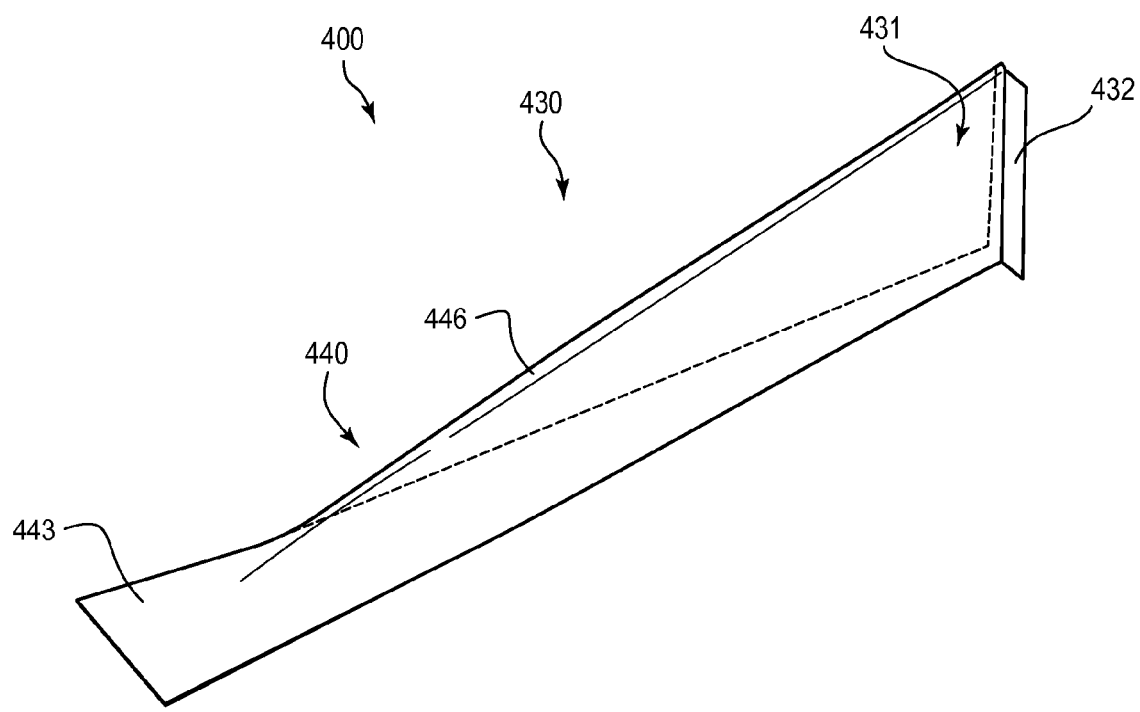
FIG. 14 is a perspective view of another embodiment of a longitudinal tether.

FIG. 14 is a perspective view of another embodiment of a longitudinal tether 430, which may be a component of an inflatable airbag assembly 400. Airbag assembly 400 and longitudinal tether 430 can resemble airbag assemblies 100, 200, and 300 and coupling and longitudinal tethers 130, 230, and 330 described above, in certain respects; accordingly, like features may be designated with like reference numerals, with the leading hundreds numeral incremented from "1" or "2" or "3" to "4". Any suitable combination of the features described with respect to airbag assemblies 100, 200, and 300 and longitudinal tethers 130, 230, and 330 can be employed with assembly 400 and longitudinal tether 430, and vice versa. Longitudinal tether 430 comprises a single piece of material that comprises a face-proximal portion 431 and a throat-proximal portion 440. Face-proximal portion 431 comprises a face attachment region 432. Throat-proximal portion 440 may comprise a throat coupling region 443 and a fold 446.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Without further elaboration, it is believed that one skilled in the art can use the preceding description to utilize the present disclosure to its fullest extent. The examples and embodiments disclosed herein are to be construed as merely illustrative and not a limitation to the scope of the present disclosure in any way. It will be apparent to those having skill in the art that changes may be made to the details of the above-described embodiments without departing from the underlying principles of the disclosure described herein. In other words, various modifications and improvements of the embodiments specifically disclosed in the description above are within the scope of the appended claims. Note that elements recited in means-plus-function format are intended to be construed in accordance with 35 U.S.C. §112 ¶6. The scope of the disclosure is therefore defined by the following claims.

The invention claimed is:

1. An inflatable airbag assembly, comprising:
an inflatable airbag having two opposing side faces, a rear face, and a front face;
a longitudinal tether coupled to the rear face and extending to the front face, wherein the longitudinal tether comprises a face-proximal portion and a throat-proximal portion, and
wherein the face-proximal portion comprises a face attachment region and a face-distal region, and wherein in a deployed configuration, the face attachment region of the face-proximal portion is vertically oriented,
wherein the throat-proximal portion comprises a first leg and a second leg,
wherein each leg comprises a throat coupling region and a throat-distal region,
wherein the throat-distal region of the first leg is vertically spaced from the throat-distal region of the second leg,
wherein each of the throat-distal regions of the first and second legs are coupled to opposing ends of the face distal region of the face-proximal portion of the longitudinal tether such that, when in a deployed configuration, the throat-distal region of the throat-proximal portion is vertically oriented; and
a lateral tether that is fixedly attached to each of the side faces and extends between the side faces,
wherein the longitudinal tether and the lateral tether are spaced from each other,
wherein the longitudinal tether and the lateral tether restrict an inflated shape of the inflatable airbag.

2. The inflatable airbag assembly of claim 1, wherein the rear face of the inflatable airbag comprises a throat portion, and wherein the throat coupling region of each leg is attached to the throat portion, and wherein the throat coupling region of each leg is horizontally oriented.

3. The inflatable airbag assembly of claim 1, wherein in the deployed configuration, a cushioning portion of the front face comprises a planar conformation.

4. The inflatable airbag assembly of claim 1, wherein each of the side faces forms an angle with a cushioning portion of the front face that is between about 80° and about 100°.

5. The inflatable airbag assembly of claim 1, wherein a portion of the face attachment region of the face-proximal portion is coupled to the front face, and wherein the portion of the face attachment region that is coupled to the front face comprises between about 15% and about 75% of a height of the front face.

6. The inflatable airbag assembly of claim 1, wherein the face attachment region of the face-proximal portion defines an occupant cushioning portion of the front face.

7. An inflatable airbag assembly, comprising:
an inflatable airbag having two opposing side faces, a rear face, and a front face;
a longitudinal tether coupled to the rear face and extending to the front face, wherein the longitudinal tether is coupled to the front face, and wherein the longitudinal tether comprises a face-proximal portion and a throat-proximal portion, and
wherein the face-proximal portion comprises a face attachment region and a face-distal region, and wherein in a deployed configuration, the face attachment region of the face-proximal portion is vertically oriented,
wherein the throat-proximal portion comprises a first leg and a second leg,
wherein each leg comprises a throat coupling region and a throat-distal region,
wherein the throat-distal region of the first leg is vertically spaced from the throat-distal region of the second leg,
wherein each of the throat-distal regions of the first and second legs are coupled to opposing ends of the face distal region of the face-proximal portion of the longitudinal tether such that, when in a deployed configuration, the throat-distal region of the throat-proximal portion is vertically oriented, and
wherein in a deployed configuration, the throat coupling region of the throat-proximal portion is horizontally oriented; and,
a lateral tether that is fixedly attached to each of the side faces and extends between the side faces,
wherein the longitudinal tether and the lateral tether are spaced from each other,
wherein the longitudinal tether and the lateral tether restrict an inflated shape of the inflatable airbag.

8. The inflatable airbag assembly of claim 7, wherein the longitudinal tether comprises three pieces of material.

9. The inflatable airbag assembly of claim 8, wherein the face-proximal portion comprises a first piece of material, the first leg of the throat-proximal portion comprises a second piece of material, and the second leg of the throat-proximal portion comprises a third piece of material.

10. The inflatable airbag assembly of claim 7, wherein between attachment points at the front face and rear face, the longitudinal tether transitions along a longitudinal axis of the longitudinal tether from a folded configuration to a non-folded configuration.

11. The inflatable airbag assembly of claim 9, wherein each of the throat-distal regions of the first and second legs are folded at their attachment point to the face-proximal portion of the longitudinal tether, and
wherein each of the throat coupling regions of the first and second legs are not folded at their attachment points on the rear face of the inflatable airbag.

12. The inflatable airbag assembly of claim 7, wherein in the deployed configuration, an occupant cushioning portion of the front face comprises a planar conformation.

13. The inflatable airbag assembly of claim 7, wherein the rear face of the inflatable airbag comprises a throat portion, and wherein the throat-proximal portion of the longitudinal tether is attached to the throat portion.

14. The inflatable airbag assembly of claim 7, wherein the face attachment region of the face-proximal portion is curved.

15. The inflatable airbag assembly of claim 7, wherein the face attachment region of the face-proximal portion comprises a curved portion and a linear portion.

16. The inflatable airbag assembly of claim 7, wherein the throat coupling regions of the first and second legs of the throat-proximal portion of the longitudinal tether overlap at their attachment point on the rear face of the inflatable airbag.

17. An inflatable airbag assembly, comprising:
an inflatable airbag having two opposing side faces, a rear face, and a front face;
a longitudinal tether coupled to the rear face and extending to the front face, wherein the longitudinal tether comprises a face-proximal portion and a throat-proximal portion, and
wherein the face-proximal portion comprises a face attachment region and a face-distal region, and wherein in a deployed configuration, the face attachment region of the face-proximal portion is vertically oriented,
wherein the face-distal region of the face-proximal portion has opposing ends,
wherein the throat-proximal portion comprises a throat-distal region and a throat coupling region, and wherein in a deployed configuration, the throat coupling region of the throat-proximal portion is horizontally oriented,
wherein the throat-distal region of the throat-proximal portion extends from the opposing ends of face-distal region of the face-proximal portion such that, when in a deployed configuration, the throat-distal region of the throat-proximal portion is vertically oriented,
wherein the face attachment region is attached to the front face of the airbag and the throat coupling region is attached to the rear face of the airbag, and
wherein, in a fully inflated configuration, the longitudinal tether transitions along a longitudinal axis of the longitudinal tether from a folded configuration comprising at least one fold to a non-folded configuration between attachment points of the longitudinal tether at the front face and the rear face; wherein said at least one fold is extending in a direction parallel to the longitudinal axis of the longitudinal tether; and,
a lateral tether that is fixedly attached to each of the side faces and extends between the side faces,
wherein the longitudinal tether and the lateral tether are spaced from each other,
wherein the longitudinal tether and the lateral tether restrict an inflated shape of the inflatable airbag.

18. The inflatable airbag assembly of claim 17, wherein the face attachment region comprises a fold.

19. The inflatable airbag assembly of claim 17, wherein the longitudinal tether comprises two pieces of material.

20. The inflatable airbag assembly of claim 19, wherein the throat-proximal portion of the longitudinal tether comprises one of the pieces of material and the face-proximal portion of the longitudinal tether comprises the other piece of material.

21. The inflatable airbag assembly of claim 17, wherein in the deployed configuration, a cushioning portion of the front face comprises a concave conformation.

22. The inflatable airbag assembly of claim 17, wherein the rear face of the inflatable airbag comprises a throat portion, and wherein the horizontally oriented portion of the longitudinal tether is attached to the throat portion.

23. The inflatable airbag assembly of claim 17, wherein the face attachment region of the face-proximal portion is curved.

24. The inflatable airbag assembly of claim 17, wherein the face attachment region of the face-proximal portion comprises a curved portion and a linear portion.

25. The inflatable airbag assembly of claim 17, wherein the throat-proximal portion comprises first and second legs.

26. The inflatable airbag assembly of claim 17, wherein the face attachment region of the face-proximal portion has a vertical height that is greater than any dimension of the throat coupling region of the throat-proximal portion.

* * * * *